United States Patent
Amin et al.

(10) Patent No.: US 12,333,793 B2
(45) Date of Patent: Jun. 17, 2025

(54) METHOD FOR COMMON DETECTING, TRACKING AND CLASSIFYING OF OBJECTS

(71) Applicant: OSRAM GmbH, Munich (DE)

(72) Inventors: Sikandar Amin, Neufahrn B. Freising (DE); Bharti Munjal, Munich (DE); Meltem Demirkus Brandlmaier, Munich (DE); Abdul Rafey Aftab, Munich (DE); Fabio Galasso, Rome (IT)

(73) Assignee: OSRAM GMBH, Munich (DE)

( * ) Notice: Subject to any disclaimer, the term of this patent is extended or adjusted under 35 U.S.C. 154(b) by 479 days.

(21) Appl. No.: 17/296,560

(22) PCT Filed: Nov. 14, 2019

(86) PCT No.: PCT/EP2019/081317
§ 371 (c)(1),
(2) Date: May 25, 2021

(87) PCT Pub. No.: WO2020/109016
PCT Pub. Date: Jun. 4, 2020

(65) Prior Publication Data
US 2022/0027664 A1   Jan. 27, 2022

(30) Foreign Application Priority Data
Nov. 26, 2018 (DE) ............. 10 2018 220 274.5
Nov. 26, 2018 (DE) ............. 10 2018 220 276.1

(51) Int. Cl.
*G06V 10/82* (2022.01)
*G06F 18/211* (2023.01)
(Continued)

(52) U.S. Cl.
CPC ............ *G06V 10/82* (2022.01); *G06F 18/211* (2023.01); *G06F 18/2415* (2023.01);
(Continued)

(58) Field of Classification Search
CPC ...... G06V 10/82; G06V 10/25; G06V 10/764; G06V 20/00; G06V 20/41; G06V 20/58;
(Continued)

(56) References Cited

U.S. PATENT DOCUMENTS

2017/0046560 A1* 2/2017 Tsur ................... G06Q 20/325
2017/0053167 A1* 2/2017 Ren .......................... G06T 7/246
(Continued)

OTHER PUBLICATIONS

Feichtenhofer, Christoph et al., "Detect to Track and Track to Detect", Oct. 22-29, 2017, pp. 3038-3046, J017 IEEE International Conference on Computer Vision {ICCV), IEEE,Venice, Italy (Year: 2017).*

(Continued)

*Primary Examiner* — Nancy Bitar
*Assistant Examiner* — Dustin Bilodeau
(74) *Attorney, Agent, or Firm* — Viering, Jentschura & Partner mbB; Robert M Bilotta, Jr.

(57) ABSTRACT

A method for machine-based training of a computer-implemented network for common detecting, tracking, and classifying of at least one object in a video image sequence having a plurality of successive individual images. A combined error may be determined during the training, which error results from the errors of the determining of the class identification vector, determining of the at least one identification vector, the determining of the specific bounding box regression, and the determining of the inter-frame regression.

10 Claims, 4 Drawing Sheets

(51) Int. Cl.
  *G06F 18/2415* (2023.01)
  *G06F 18/2431* (2023.01)
  *G06N 3/08* (2023.01)
  *G06V 10/25* (2022.01)
  *G06V 10/764* (2022.01)
  *G06V 20/00* (2022.01)
  *G06V 20/40* (2022.01)
  *G06V 20/58* (2022.01)

(52) U.S. Cl.
  CPC ........... *G06F 18/2431* (2023.01); *G06N 3/08* (2013.01); *G06V 10/25* (2022.01); *G06V 10/764* (2022.01); *G06V 20/00* (2022.01); *G06V 20/41* (2022.01); *G06V 20/58* (2022.01)

(58) Field of Classification Search
  CPC ............... G06F 18/211; G06F 18/2415; G06F 18/2431; G06F 18/2413; G06N 3/08; G06T 2207/10016; G06T 2207/20081; G06T 2207/20084; G06T 2207/30236; G06T 2207/30261; G06T 7/246
  See application file for complete search history.

(56) References Cited

U.S. PATENT DOCUMENTS

| | | | |
|---|---|---|---|
| 2018/0137892 A1* | 5/2018 | Ding | G11B 27/031 |
| 2018/0341813 A1* | 11/2018 | Chen | G06V 20/46 |
| 2020/0051254 A1* | 2/2020 | Habibian | G06T 7/75 |

OTHER PUBLICATIONS

International Search Report issued for the corresponding PCT application No. PCT/EP2019/081317, mailed Feb. 20, 2020, 4 pages (for informational purposes only).

Feichtenhofer, Christoph et al., "Detect to Track and Track to Detect", Oct. 22-29, 2017, pp. 3038-3046, 2017 IEEE International Conference on Computer Vision (ICCV), IEEE,Venice, Italy.

Xiao, Tong et al., "Joint Detection and Identification Feature Learning for Person Search", Jul. 21-26, 2017, pp. 3376-3385, 2017 IEEE Conference on Computer Vision and Pattern Recognition (CVPR), IEEE, Honolulu, HI, USA.

Luo, Wenjie et al., "Fast and Furious: Real Time End-to-End 3D Detection, Tracking and Motion Forecasting with a Single Convolutional Net", IEEE, Jun. 18-23, 2018, pp. 3569-3577, 2018 IEEE/CVF Conference on Computer Vision and Pattern Recognition, Salt Lake City, UT, USA.

Search Report issued for the German patent application No. 10 2018 220 274.5, issued Nov. 18, 2019, 13 pages (for informational purposes only).

Arun, Aditya et al., "Dissimilarity Coefficient based Weakly Supervised Object Detection", Jun. 15-20, 2019, 14 pages, Conference: 2019 IEEE/CVF Conference on Computer Vision and Pattern Recognition (CVPR), IEEE, Long Beach, CA, USA.

Bewley, Alex, "Vision based Detection and Tracking in Dynamic Environments with Minimal Supervision", 2017, 194 pages, PhD Thesis, Queensland University of Technology.

Huang, Jonathan et al., "Speed/accuracy trade-offs for modern convolutional object detectors", Jul. 21-26, 2017, pp. 7310-7319, 2017 IEEE Conference on Computer Vision and Pattern Recognition (CVPR), IEEE, Honolulu, IH USA.

Wang, Hanyu et al., "MPNET: An End-to-End Deep Neural Network for Object Detection in Surveillance Video", IEEE, May 24, 2018, pp. 30296-30308, IEEE Access, vol. 6, IEEE.

* cited by examiner

METHOD FOR COMMON DETECTING, TRACKING AND CLASSIFYING OF OBJECTS

CROSS-REFERENCE TO RELATED APPLICATIONS

The present application is a national stage entry according to 35 U.S.C. § 371 of PCT Application No. PCT/EP2019/081317 filed on Nov. 14, 2019; which claims priority to German Patent Application Serial Nos. 102018220276.1 filed on Nov. 26, 2018 and to German Patent Application Serial Nos. 102018220 274.5 filed on Nov. 26, 2018; all of which are incorporated herein by reference in their entirety and for all purposes.

TECHNICAL FIELD

The invention relates to a method for common detecting, tracking and classifying of at least one object in a video image sequence. The invention furthermore relates to a method for machine-based training of a computer-implemented network for common detecting, tracking and classifying of at least one object in a video image sequence. Moreover, the invention relates to a system for classifying objects, to a computer program product stored on the medium, and to an arrangement.

BACKGROUND

The automated identification, tracking and classification of objects is becoming increasingly important in various fields such as, for example, in the monitoring of persons, or locations, in sport, in motion analysis and in the field of autonomous driving. In the context thereof, for example, one or more objects within a field of view of a camera are identified, i.e. perceived as separate from the background, and are optionally classified in classes, their movements are tracked over a period of time and statements are made regarding where the objects will be situated in the future. In the field of autonomous driving, the identification and classification of objects and the tracking thereof over a period of time are of the utmost importance in order to be able to make a risk assessment or to serve as a decision basis for actions based thereon. For the monitoring of locations or flows of persons, an accurate identification of persons on the basis of unique features may be necessary in order to be able to reliably identify them even after leaving and later re-entering the region being monitored.

Machine-based and trained networks are often used for the automated detection, identification and tracking, these networks being referred to as "deep learning" networks. Deep learning networks are better suited to complex objectives than networks having rigid rules, since the large number of variations cannot be concretely mapped and programmed in rules. Deep learning networks or algorithms are already often used for pattern recognition. For the purpose, too, of detecting and identifying objects in a field of view, use is made of networks that are trained to do this.

It should be taken into account here, however, that existing solutions, primarily at low image refresh rates, can have difficulties with object tracking or the reidentification of objects. This occurs primarily if the speed of an object is very high relative to the image refresh rate, in other words changes greatly between the frames. This last is of significance, inter alia, if an object that has already been identified leaves the image region and subsequently returns again or if tracking of the object fails on account of the low frame rate.

SUMMARY

Further-reaching solutions enabling a higher flexibility and better accuracy in the identification, tracking and classification of objects even at a low image refresh rate would thus be desirable.

An algorithm which is less memory-intensive and faster than conventional solutions is implemented in the solution proposed here. This is achieved by virtue of only a single neural network calculation being carried out for each point in time. For this purpose, the detection, object tracking and feature determination and classification of each object in an image are determined simultaneously. In particular, the motion tracking of an object and the identification or reidentification are also effected simultaneously.

Such simultaneous determination increases the performance by comparison with conventional algorithms, in particular at low image refresh rates or with long time intervals between the frames of a video sequence. In particular, a computer-implemented deep learning network is trained in such a way that the detecting, tracking and classifying or identifying of one object or of a plurality of objects in frames of a video sequence are effected simultaneously.

In a method for common detecting, tracking and classifying of at least one object in a video image sequence having a multiplicity of successive frames by means of a trained computer-implemented network, the following steps are performed:

receiving a first frame and a succeeding second frame;
detecting at least one object in the first frame and at least one object in the succeeding second frame;
selecting an object in each case from the first and second frames;
ascertaining at least one classification vector and a position for the selected objects from the first and second frames;
ascertaining an association value on the basis of the ascertained classification vector and the position; and
generating a temporarily consistent and unique identification vector of the at least one object for each frame in response to the ascertained association value. In this case, a relative weighting between the ascertained classification vector and the position, said weighting being dependent on the time between the first and second frames, is provided for the generation of the association value. In this context, the term identification vector is understood to mean a vector or value that is unique, such that one object is distinguishable from another object by means of the identification vector.

With the proposed principle, therefore, in two successive frames, objects are detected, identified and tracked over the frames. The position and the feature or identification vectors of the respective objects are advantageously used for this purpose. A relative weighting between the classification vector and the position features or the position of the object is attained as a result of the dependence of the association value on the time and thus on the image refresh rate between the first and second frames. In one aspect, the weighting contains a dependence inversely on the time between the two frames. The latter is chosen such that at low frame rates the relative weighting shifts toward the classification vector, such that objects are nevertheless reliably and certainly identifiable and trackable. In other words, the weighting factor for the classification vector, by comparison with the weighting of the position, becomes all the greater, the more time elapses between the frames or the lower image refresh rate becomes.

Furthermore, the classification vector and the position make it possible still to detect or to identify an object even if it is partly concealed by other objects in the succeeding frame.

In this context, provision can additionally be made for performing an association of an object in the first or second frame also with objects in a third frame. There may be cases in which an association of an object in the second frame with an object of the first frame is not possible, and the object is thus "leftover" in the second frame. In such a case where no vector of an object of a first frame is assignable to a unique identification vector of an object of a second frame, the identification vector of the object of the second frame can be compared with the identification vector of an object of a third frame temporarily preceding the first frame.

In this scenario, the unique and temporarily consistent identification vector of the object makes possible an association with objects in preceding frames as well. A renewed identification or a reidentification of an object can thus be effected even if said object is not visible in some frames. One typical application would be afforded for example by a vehicle which is concealed by another vehicle in part and over a plurality of frames and then reappears. By virtue of the proposed principle, the vehicle is reidentified and not recognized as a new object.

In one aspect, the step of detecting at least one object comprises generating a bounding box surrounding or enclosing the at least one object. Likewise, a prediction relating to the change of the bounding box from the first frame toward the second frame is generated for the bounding box. Furthermore, a velocity vector is formed for the bounding box of the first frame. In one aspect, these three steps are carried out simultaneously. Likewise, a bounding box can be provided for each object of a frame.

In a further aspect, the step of selecting comprises at least one of the following steps, namely:
  selecting the bounding box of the first frame and selecting the bounding box of the second frame;
  selecting the prediction and selecting the bounding box of the second frame; and
  selecting the velocity vector and selecting the bounding box of the second frame.

Candidates for the subsequent association step are selected by means of the selecting process. Two information values are then extracted for each of the selected bounding boxes, namely the position and an associated classification vector. In accordance with one aspect, the step of ascertaining at least one classification vector for the object comprises acquiring features of the object, calculating a unique feature vector from the acquired features, and classifying the object from a group of predefined classes on the basis of the acquired features or on the basis of the calculated feature vector.

In this case, the group of predefined classes can comprise, inter alia, at least one of the following classes: pedestrians, automobiles, buses, bicycles, trucks, tractors, animals, motorcycles and obstacles, in particular stationary or immobile obstacles.

In another aspect, a special method, for example a "Hungarian combinatorial optimization" method, is used for the step of generating a temporarily consistent and unique identification vector.

The proposed method, while the method is being carried out, within the base network, shares a plurality of convolutions for the different tasks, in particular for the detection of the objects in the frames, i.e. generating the bounding box, generating the prediction for the bounding box and creating the velocity vector. As result, the efficiency of the method is increased and at the same time the hardware requirements are reduced. In particular, in further steps of the method, the bounding boxes surrounding the at least one object can be used for various further tasks such as, for example, the generation of the prediction or the generation of the classification vector and of the velocity vector, and for identifying the object. In contrast to conventional networks, in which the different tasks are performed by independent networks, according to the proposed principle each task is performed jointly or in parallel and indeed not sequentially and the results of a preceding step are used jointly or in parallel for the succeeding tasks.

In an arrangement according to the proposed principle, such as a computer-implemented arrangement, provision is made of a buffer memory for at least one first and one second frame of a video sequence. An RPN module ("regional proposal network") is coupled to the buffer memory. The RPN module is configured for generating a first multiplicity of object proposals from the first frame and a second multiplicity of object proposals from the second frame, which may be referred to hereinafter as ROIs or "regions of interest". A determination and identification module is connected to the RPN module. Said module is configured to generate from the first multiplicity and the second multiplicity an identification vector for each object within the first and second multiplicities. In addition, said module is configured, in parallel with the above, to perform a classification of the respective objects and to generate a class-specific bounding box regression for each proposal.

A prediction module is likewise coupled to the RPN module and is thus arranged in parallel with the determination and identification module with regard to the functionality. Said prediction module is configured for a correlation analysis for an object in a first frame with respect to the position thereof with corresponding objects of a second frame. In other words, the prediction module is configured to make a prediction about a development of an object proposal from the first frame with regard to the second frame.

For this purpose, the prediction module in one aspect is configured with a correlation layer. The latter is configured to determine a correlation between an object proposal in a first frame and adjacent windows in a second frame.

Another aspect is concerned with the method for machine-based training of a computer-implemented network for common detecting, tracking and classifying of at least one object in a video image sequence. In this respect, the video image sequence has a multiplicity of successive frames.

In a first step, the method comprises providing a multiplicity of frame pairs, wherein each frame pair comprises a first frame and a succeeding second frame and each frame has at least one object proposal, also called "regions of interest" or ROI, to which a respective class identification vector is uniquely assigned. In one expedient configuration, the at least one object proposal can have in each case an object which is uniquely identifiable in terms of its class by means of the class identification vector.

For each object proposal, a feature vector is then determined, to which the class identification vector is assigned. The ascertained feature vector can thus be assigned to a class. An identification vector and a specific bounding box regression are likewise determined. The latter is specific to the class identification vector. Afterward, a correlated feature map between the first frame and the succeeding second frame is generated and an inter-frame regression is determined for each object proposal.

For the training of the computer-implemented network, a combined error is then minimized, said error resulting from the errors in determining the class identification vector, in determining the at least one identification vector and in determining the specific bounding box regression and the inter-frame regression.

As a result of the training of the network with a combined error of the type mentioned above, detection of an object, tracking and feature identification for the object are trained simultaneously. Since the class identification vector is fixedly predefined for the object proposal and thus for the object within the object proposal, the method necessitates training of features which correspond to the respective class.

In a further-reaching aspect, the step for each of the at least one object proposal comprises pooling features of a predefined size from the frames by means of an ROI align method. This method can contain an R-CNN method or can be part thereof. In this case, the predefined size can amount to a few pixels, for example 7×7 pixels. The pooled features are convolved by means of a convolution block and subsequently merged to form a global vector. An online instance matching loss (OIM) method can be used for determining the identification vector. In particular, the correct determination of the feature vector and/or of the identification vector is learned by means of this method. In a further step, determining the identification vector comprises applying a fully connected layer of a defined size in order to obtain a smaller identification vector by comparison with the global vector.

In a further configuration, a classification score is ascertained, the latter being required for the correct classification of the object in the object proposal. Said score can be determined by applying two fully connected layers of size (C+1) and x(C+1), wherein (C+1) is the number of class identification vectors and thus classes including the image background.

In order to minimize the combined error from the individual preceding determinations, various methods can be applied. By way of example, it is possible to apply a softmax cross entropy loss method for determining the error in the classification. A smooth L1-loss method serves for determining the bounding box regression error and for determining the error in an inter-frame regression.

A further aspect relates to the step of determining the correlated feature map. This can be done by ascertaining a correlation between the first feature map of the first frame and adjacent segments in a second feature map of the second frame. In other words, a correlation between features of the first and second feature maps is acquired by features at a position of the first feature map of the first frame being compared with the features of a position adjacent to the first position.

A further aspect relates to an arrangement, such as a computer-implemented arrangement. This arrangement comprises a buffer memory for at least one first and one second frame of a video sequence; and an RPN module for generating a first multiplicity of independent object proposals from the first frame and a second multiplicity of independent object proposals from the second frame. The arrangement contains a determination and identification module trained jointly with a prediction module, and the prediction module trained jointly with the determination and identification module. All modules are coupled to the RPN module.

The trained determination and identification module is configured to identify objects from the first multiplicity and the second multiplicity of object proposals and to detect them in the first and second frames, and is further configured to make a prediction of the position of an object in the first frame and in the second frame from the object proposals. The prediction module is configured to make an inter-frame prediction for each object in the first frame on the basis of the first multiplicity of object proposals and the second multiplicity of object proposals.

The joint training and the end-to-end optimization significantly improve the efficiency and the recognition, classification and tracking rate precisely at low image refresh rates.

In a further-reaching aspect, a BaseNet architecture is connected upstream of the RPN module. Said architecture is configured to ascertain a multiplicity of base features for the first and second frames, which base features are able to be fed to the RPN module for the purpose of generating the object proposals.

In another aspect, the trained determination and identification module is configured to merge features of a predetermined size from the base features for each proposal in order to provide a multidimensional feature vector. In addition, it can be configured to determine a classification parameter of the object in the object proposal with the aid of the feature vector. In this case, the classification parameter can be selected from a set of predetermined classes. As a result, the arrangement can be trained and optimized even to quite specific problems and situations.

In a further aspect, the trained determination and identification module is configured to assign an object in the object proposal to an a unique identification vector. This can be expedient if the object disappears over a few frames and then reappears. A reidentification can be reliably performed by means of the identification vector since each object contains a unique identification vector. The trained determination and identification module can likewise be configured to generate a bounding box regression for each object proposal.

Another aspect relates to the trained prediction module. The latter can be configured to predict the regression targets of the detected objects from the first frame to the second frame on the basis of the base features of the first and second frames.

BRIEF DESCRIPTION OF THE DRAWINGS

The non-limiting embodiments are explained in detail below on the basis of a plurality of exemplary embodiments and with reference to the drawings. In this regard.

Identical, similar or equivalent elements are provided with the same reference signs in the figures. The figures and the proportions of the elements represented in the figures among each other are not to be considered as true to scale. Rather, individual elements may be oversized for better representability and/or for better comprehensibility.

DETAILED DESCRIPTION

Automated object detection ad recognition precisely in the field of video monitoring and robot technology has faced various challenges for a long time. The tracking of an object is also of importance, this often becoming necessary in order to be able to handle dynamic scenes. Identification of persons and tracking of an inherently identified person or object across a plurality of fields of view have gained in importance in recent years.

Figure 1:
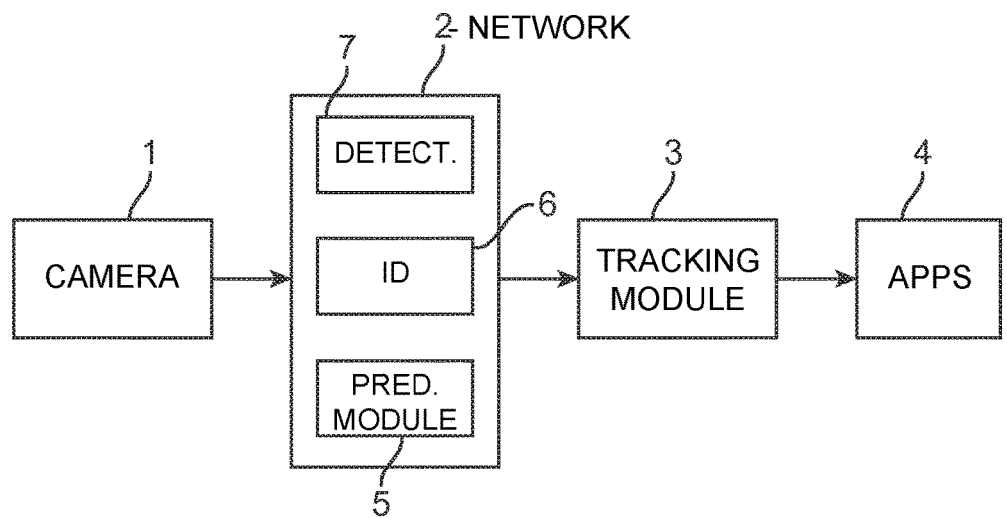
FIG. 1 shows a flow diagram of the proposed system.

In this context, FIG. 1 shows a simple flow chart for a system, in which various tasks are performed jointly and simultaneously. In this case, a camera 1 records a multiplicity of images, for example in the form of a video sequence. The images are fed to network 2, which will be explained in greater detail below. Said network detects and identifies different objects that are recorded by the camera in its field of view, and transfers them to a tracking module 3. The tracking module generates trajectories over time from the information of the network 2 for each of the objects, which trajectories can subsequently be transferred to various applications 4 for evaluation.

In this case, the network 2 comprises a plurality of functional elements, provided with the reference signs 5, 6 and 7. The functional elements include, inter alia, a module or a function for identifying an object, a module or function for detecting same within the transferred image, and a module or function for a prediction of movement or position, in order to be able to track the object over a relatively long period of time and a plurality of images.

An object within an image was detected by the module 7. Detectors of this type operate either as "region proposal" detectors or as individual detectors. In the case of region proposal-based detectors, the frame is divided into different regions and the latter are correspondingly processed by different methods. For this purpose, a so-called RPN network is provided, which generates a set of object proposals (the latter are often equated with the regions), which are forwarded to a neural network for classification and regression. "Fast R-CNN", "faster, R-CNN" and "RFCN" methods or else generally ROI align methods are used for generating object proposals. Other variants of object detectors do not generate object proposals, but rather determine "bounding boxes" around the objects and the corresponding classifications of the image for the individual objects directly. Object detectors of this type are based on YOLO methods, for example.

For video sequences, i.e. a multiplicity of successive images, a success rate for object detection can be significantly improved if the corresponding objects are visible over a plurality of frames, for example. By contrast, movement of objects in a video sequence from one image to the next makes detection more difficult since the position of the object changes as a result of the movement. In order to reduce this problem, conventional detectors and methods involve carrying out detection of the object together with tracking thereof and determining and minimizing the error. Such approaches can be used not only for individual objects but also for a plurality of objects within an image.

Besides object detection, however, there is also a special emphasis on identification and classification in various classes or reidentification. This requirement arises from various applications in which it is necessary for the dictated object also to be better characterized with regard to its properties. By way of example, in road traffic it would be necessary to be able to differentiate a bus or an automobile sufficiently accurately from a pedestrian or a cyclist. Only then is it possible to make a risk assessment sufficiently well and to select the correct actions in relation thereto.

In other applications, reidentification of an object is necessary. By way of example, a person moving through a plurality of fields of view of cameras could be not only detected but also identified and tracked across these fields. The same applies in road traffic, too, if for example one object is concealed by another object for a short time and after reappearing it is intended to be declared as an already known object.

For the purpose of identification or reidentification and subsequent classification, it is proposed to train a unique feature vector for each identity and hence class. This feature vector should be invariant vis-à-vis changes in the camera position, the lighting, the background, the colors and the perspective view.

Various methods proposed for this purpose use cut bounding boxes with the object to be characterized. It has been established that it is possible to reidentify and detect objects in entire images. Tracking of the object across a plurality of frames can additionally be improved with a unique identity vector.

Finally, besides a function for detection 7 and identification 6, the network 2 comprises a prediction module 5, which makes it possible to make a prediction about the movement or the position of an object in a succeeding frame. Such a prediction can be used not only to improve the detection or tracking of an object, but also for a risk analysis with regard to the direction of movement of an object, for example in the field of autonomous driving or robot technology.

Figure 3:
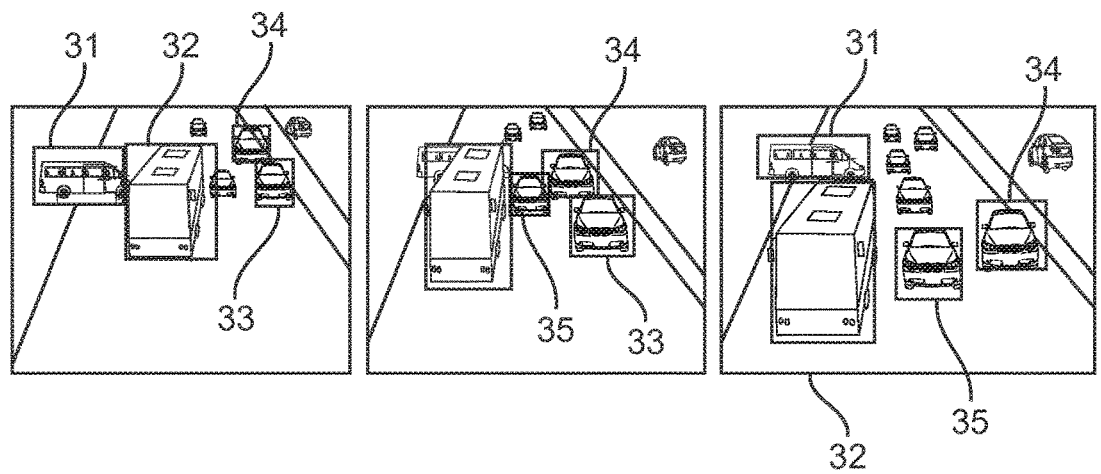
FIG. 3 shows a video sequence with frames for representing results with a network according to the proposed principle.

Results obtained by such a network are illustrated in FIG. 3. These show three successive frames of traffic on a road at the times t−20, t−10 and t. In the first frame at the time t−20, the network has recognized a total of 4 different objects. They include a bus 32, two cars 33 and 34 travelling one behind the other in the far left lane, and a small van 31 turning into the road behind the bus. Each of the identified objects is additionally surrounded by a corresponding bounding box, i.e. a rectangle surrounding the exterior dimensions of the respective object, or vehicle. As indicated in the image, the bounding boxes are additionally represented with slightly different colors, which correspond to a unique characterization and classification. In the succeeding image, the vehicles have moved. By virtue of the identification and the tracking module of the network, the system is able to track the objects further and simultaneously identify them as objects that were already present in the preceding frame. In particular, the two cars 33 and 34 have come somewhat closer, and the network recognizes them and furthermore assigns the same ID (identification) and class to them. In addition, the network has recognized a new object 35, assigned a unique identification to it and classified it as a further car.

By contrast, in the image t−10, the van recognized in the previous image has disappeared behind the bus and is thus concealed by this object. Accordingly, the network 2 has lost the object, that is to say that tracking of the van has failed.

In the last frame t, in the meantime the vehicle 33 has disappeared from the field of view. At the same time, the van 31 is no longer concealed by the bus, but rather has been recognized again by the network. In accordance with the proposed principle, the network 2 is able not only to detect the object again and to classify it correctly, but also to identify it as an already known vehicle. This is possible since training of the network is effected simultaneously in accordance with the proposed principle.

Figure 4:
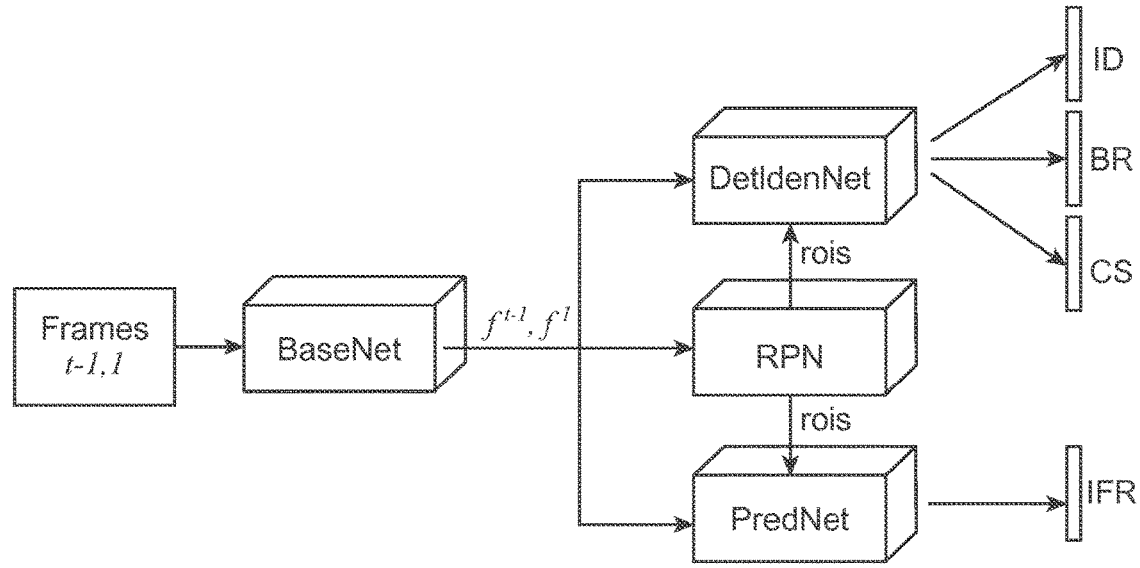
FIG. 4 shows an embodiment of a computer-implemented arrangement with the various functional modules.

FIG. 4 shows a model according to the proposed principle. Object recognition and tracking is addressed by common training of the three tests of recognition, prediction and reidentification. The term "common", here is understood to mean parallel or combined training. The training is therefore not sequential, that is to say that the individual tasks are not trained independently of one another, but rather in a combination. In the field of machine-based learning, this means that the error during training is not minimized individually and separately for each task, rather a combination of all errors that occur is minimized.

In contrast to traditional sequential approaches, the method and arrangement provide, in the context of recognition, detection, identification, classification and tracking, a uniform end-to-end architecture which optimizes these various tasks jointly and together.

Figure 5:
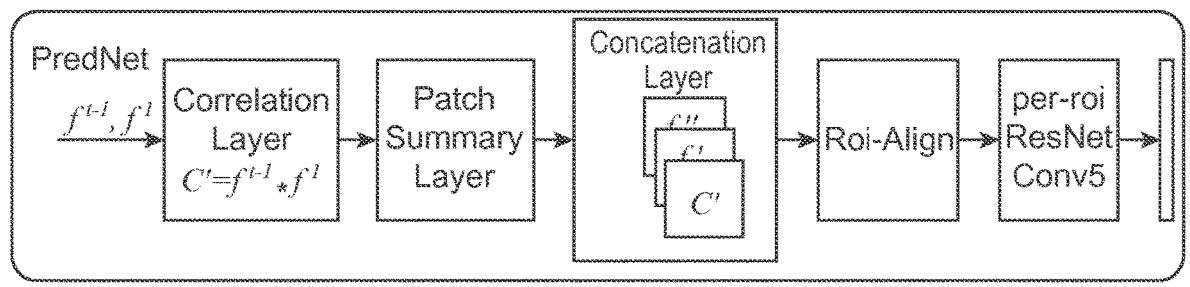
FIG. 5 shows a schematic illustration of the PredNet module for determining a prediction of the movement or position of an object.

The proposed model architecture is illustrated in FIG. 4 and contains the two output branches DetIdenNet and PredNet. The construction of the latter module is also shown in FIG. 5. In this case, the first branch or module DetIdenNet outputs an identity vector ID, a box regression BR and a classification value CS. The architecture requires two successive frames $I^{t-1}$ and $I^t$ at the times t−1 and t. However, instead of t−1 (i.e. the previous image), any other time t−δ can also be used. These correspond to two successive frames. The two frames are firstly guided through the module BaseNet, which comprises the first four blocks (Conv1-4) of a ResNet architecture. In this case, $f^{t-1}$ and $f^t$ ($\in h \times w \times d$) present the base features for the two frames. h, w and d are height, width and number of channels of the base features. In addition to these functions, a region proposal network (RPN) or RPN module is connected downstream of the BaseNet module in order to obtain independent object proposals from both frames, which are forwarded to the two modules DetIdenNet and PredNet.

For each proposal from the RPN module, the module DetIdenNet pools features of size 7×7 from the respective base features by using an ROI align method. The merged features are then guided through a series of convolutions from the last convolution block (Conv5) of ResNet followed by global averaging. This gives rise to a 2048-dimensional feature for each proposal. This feature is then passed on to two sibling branches for identification and detection, respectively.

The identification branch firstly applies a fully connected layer of size 256, thereby giving rise to a lower-dimensional identity feature. The detection branch applies two parallel, fully connected layers of size (C+1) and 4×(C+1). This yields a classification value and a class-specific bounding box regression for each proposal. In this case, (C+1) is the number of classes including the background. For the training, for the detection branch use is made of a "softmax cross entropy loss" method for classification and a smooth L1-loss method for the bounding box regression. In order to learn and train the embedding of the 256-dimensional identification function, an online instance matching loss (OIM) method is used.

In view of the base features $f^{t-1}$ and $f^t$ of size h×w×d of the two frames, PredNet aims to predict the regression for the object recognition, specifically from the first image to the second. In order to achieve this, PredNet firstly uses a correlation layer, which uses the correlation of each feature $f^{t-1}(x, y)$ in the first feature map with its adjacent (2n+1)× (2n+1) window in the second feature map. This procedure produces a feature map C of size h(2n+1)×w(2n+1), as shown in the following equation:

$$C(x,y)=\Sigma_d f^{t-1}(x,a,d)1(n,n)\odot N[f^t(x,y,d)]$$

in this case, $f^{t-1}(x, y, d)$ and $f^t(x, y, d)$ are scalar values of the spatial position x, y and the channel d in the feature map $f^{t-1}$ and $f^t$. 1(n, n) is a (2n+1)×(2n+1) matrix of ones that is used to repeat the scalar value $f^{t-1}(x, y, d)$ with respect to a (2n+1)×(2n+1) matrix. N[ft(x, y, d)] is the (2n+1)×(2n+1) neighborhood matrix of ft(x, y, d). The equation above firstly calculates the element-by-element multiplication of the matrix $f^{t-1}(x, y, d)1(n; n)$ by the neighborhood matrix N[ft(x, y, d)] and then sums it along the channel dimension. It should be pointed out that C(x, y) is a block of size (2n+1)×(2n+1) and indicates the correlation of the feature $f^{t-1}(x, y)$ with the (2n+1)×(2n+1) neighborhood of the matrix in $f^t(x; y)$. The correlated feature map C is then transferred to a patch summary layer, which summarizes each (2n+1)× (2n+1) window using a filter convolution of size (2n+1) (2n+1) with step size 2n+1 and outputs 512 output channels. This summarized feature map of size (h×w×512) is then concatenated with the original base features $f^{t-1}$ and $f^t$, and a 1×1 convolution is carried out in order to obtain d output channels. This allows the standard Conv5 block of the ResNet architecture to be used. These features are then processed further using the ROI align method and together with the detection bounding boxes of the first frame, followed by a Conv5 block of ResNet and a fully connected layer around a regression $\Delta^t=(\Delta_x^t,\Delta_y^t,\Delta_w^t,\Delta_h^t)$ for each tracking or track object proposal. During training, a smooth L1-loss method between the ground truth targets and the predicted targets is carried out for PredNet.

In order to jointly train the branches DetIdenNet and PredNet of the arrangement network, a combinatorial total error is used, composed of the classification loss ($L_{cls}$), the regression loss ($L_{reg}$), a regression loss for the inter-frame bounding boxes ($L_{tra}$) and the identification loss ($L_{iden}$). The total loss for a number of N object proposals (ROIs) thus results as:

$$L = \frac{1}{N}\sum_{j=1}^{N} L_{cls}(p_{j,c*}) + \lambda_1 \frac{1}{N_{fg}} \sum_{j=1}^{N}[c_j^* > 0]L_{reg}(b_j, b_j^*) + \lambda_2 \frac{1}{N_{tra}} \sum_{j=1}^{N_{tra}} L_{tra}(\Delta_j^t, \Delta_j^{*,t}) + \lambda_3 \frac{1}{N_{iden}} \sum_{j=1}^{N_{iden}} L_{iden}(q_{j,i*})$$

In this case, for each object proposal j, $p_{j,c}$ is the predicted classification probability of its ground truth class c* and $b_j$, $b_j^*$ are the predicted and ground truth bounding box targets. In the tracking loss, the terms $\Delta_j^t$ and $\Delta_j^{*,t}$ stand for the normalized inter-frame, predicted and ground truth bounding box targets.

For training, only $N_{tra}$ ground truths (track ROIs) from the first frame t−1 were used, which also have corresponding boxes (identical Id) in the frame t. In the case of interference, use is made of all detections (N) from the first frame tracking object proposals (track ROIs). In the identity loss $q_{j,i}$ there is the predicted probability of the object proposal j for its ground truth identifier i. This loss is calculated only for the object proposals in the foreground, to which a ground truth identification i*($N_{iden}$) is also assigned. The loss weight A is set to 1.

For the tracking, a simple tracking-by-detection algorithm is implemented, which links the recognition hypothesis with target paths by optimization of the Hungarian association method. For this purpose, the cosine similarity of the ID features and/or of the IOU overlap is taken into account in order to calculate the affinity matrix for the Hungarian association. A simple linear motion model and bounding box predictions from the PredNet module are used to predict the target bounding boxes in the succeeding frame. The aim is to assign each detection obtained to a correct trajectory from the available set of trajectories at the time t−1.

The method uses a tracking buffer for this purpose. Said tracking buffer contains the trajectory information on all trajectories at t−j. The trajectory information comprises (a) the bounding box at the trajectory head, the feature vector at the trajectory head with respect to the average velocity vector of the target.

In order to assign a correct trajectory to a detection, a bipartite graph between all detections in the current image t and all trajectories in the image t−1 is created, followed by the Hungarian association method, in order to find an optimum set of one-to-one assignments. The association weight of the graph edges is indicated by an affinity matrix.

Two types of association metrics can be distinguished for this purpose. Firstly an association of bounding box intersection union (IoU), substantially based on the intersection of bounding boxes, and secondly an association based on ID feature embedding. The cosine similarity is used to calculate the association. In comparison with ID functions, the IoU metric enables supplementary spatial pretracking for the tracking step. This prevents matching of incorrect objects having a similar appearance, for example automobiles of the same model/same marque, or persons having similar clothing. In this context, it has been found that a simple combination of the two metrics yields improvements vis-à-vis separate use of the metrics.

The following chart shows the sequence of the method for tracking objects:

| Algorithm 1 Tracking algorithm |
| --- |
| Input : Frame at time t, Detections $D^t$, ID-features $f^t$, predictions $Pred^t$, buffer_size, $w_1$, $w_2$ |
| Initialization: j = 1 |
|     1.    Gel trajectory information $T^{t-j}$ at t − j from the trajectory buffer. |
|     2.    Calculate the overall affinity matrix, $A^t$ (See Eq. 3). |
|     3.    Use hungarian method to find optimal assignment between $T^{t-j}$ and $D^t$. |
|     4.    Update trajectories $T^t$ at frame t for assigned detections, $D_a^t \in D^t$ |
|     5.    If j < buffer_size do: <br> j = j + 1 <br> for unassigned detections, $D_u^t \in D^t$. repeat steps 1 to 5 with $w_1 = 0$ and $w_2 = 1$. |
|     6.    Assign new ID to all $D_u^t$, and initialize new trajectories. |
|     7.    For all unmatched trajectories, $T_u^{t-1}$: <br> add prediction, $Pred_u^t$ if available from network <br> else propatgate the trajectory based on a linear motion model. |

In order to make the tracking module more robust vis-à-vis occlusions and absent detections or predictions, a buffer is used which can hold trajectories which were not associated with a new detection. For the detections in the case of a frame t which cannot be assigned to a trajectory of the image t−1, their identification vector ID is compared for the trajectories that are not allocated or are held in the buffer. These are trajectories from preceding images T−2, t−3, etc. Trajectories of the frame t−2 which are held in the buffer are those for which there was no association with a detection in the image t−1. Such temporarily interrupted trajectories are therefore available for the matching for image t.

The buffer for these held trajectories has a predefined size which is thus related to how far back in time trajectories can be associated with newly detected objects. In order to reduce fragmentation in the trajectories, it is possible to use a simple model in which the pausing trajectories are widened for a short period of time in addition to the predictions from the PredNet module.

Figure 2:
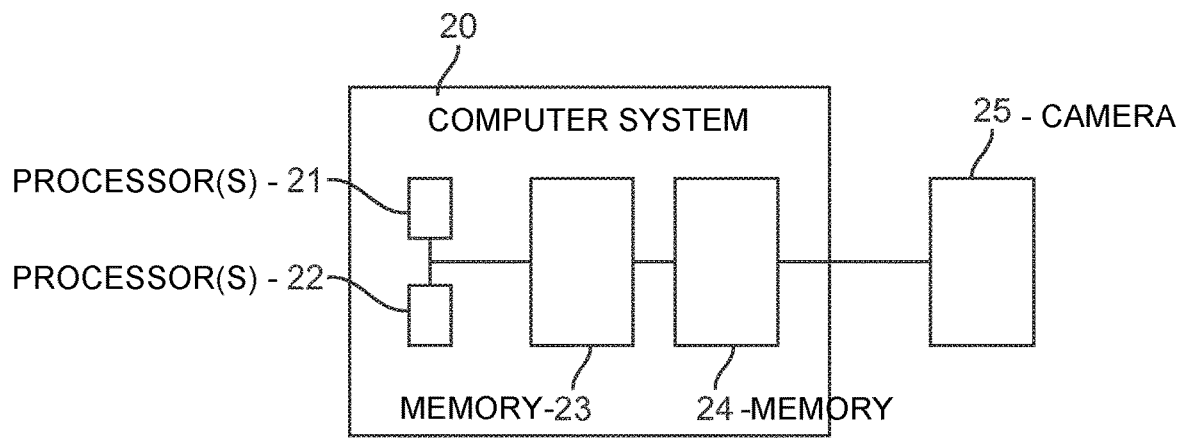
FIG. 2 shows a computer system for carrying out the proposed method.

FIG. 2 shows a computer arrangement with camera system on which the proposed method can proceed and also an arrangement with the various functional modules can be implemented. In particular, the computer system is configured for the implementation of neural networks which are implemented by machine-based learning. For this purpose, the computer system 20 contains one or more processors 21 and 22. The processors are configured for massively parallel processing of data. By way of example, chips from NVidia™ that are based on the Xavier™, Volta™ or Post-Volta™ architecture are suitable for this purpose. The processors are connected via a bus (indicated in the illustration), inter alia, to a fast memory 23, in which the frames to be processed are stored. Furthermore, the memory 23 can also contain further data, such as, for example, the vector definitions or the ROIs and the like. A second, slower memory 24 is coupled to the fast memory 23. Said second memory contains a video sequence consisting of at least two, but often a plurality of frames. The video sequence is supplied by a camera 25 or a corresponding sensor.

Figure 6:
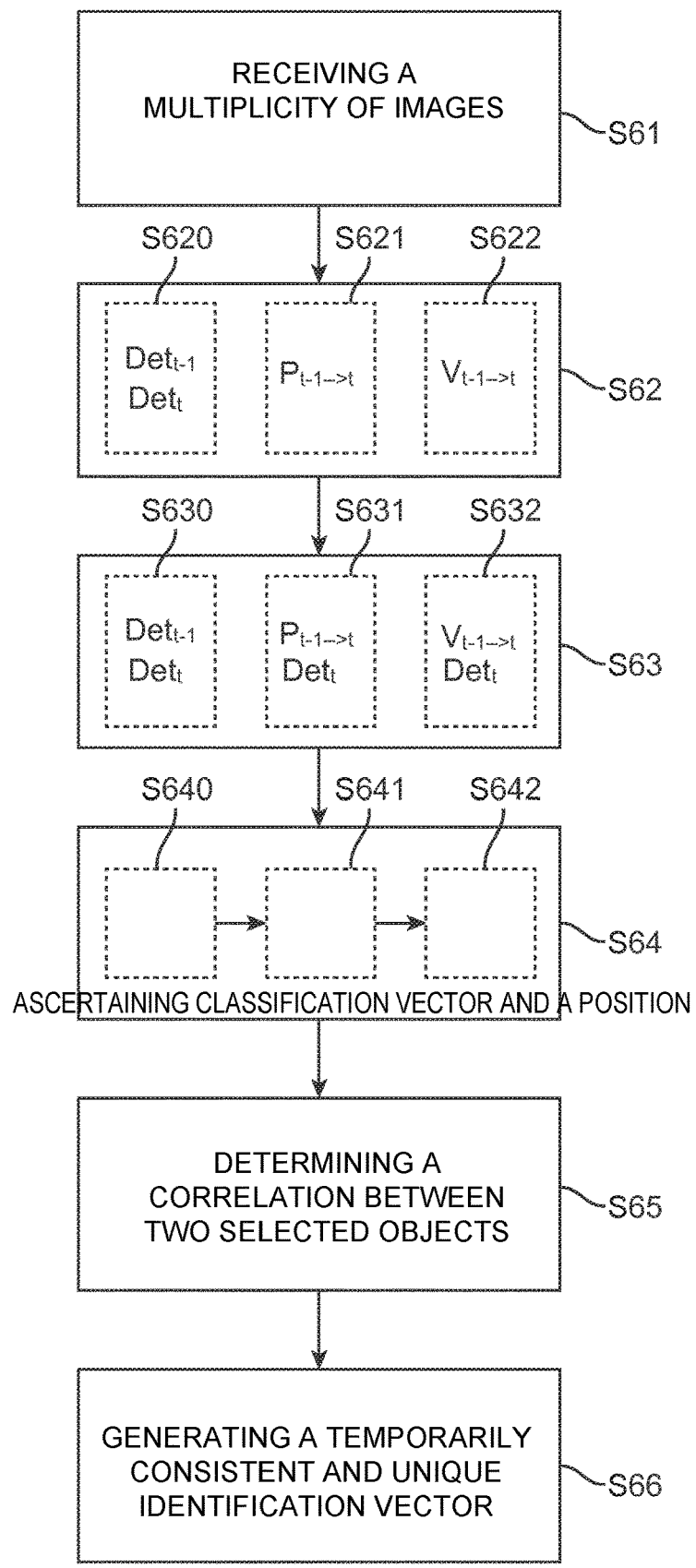
FIG. 6 shows an exemplary embodiment of the method for common detecting, tracking and classifying of at least one object in a video image sequence.

FIG. 6 illustrates an exemplary embodiment of the method for common detecting, tracking and classifying of at least one object in a video image sequence. In the method, the network has already been trained, specifically in such a way that detecting, identifying and tracking were trained jointly, for example by a method according to the method illustrated above. A first step S61 involves receiving a multiplicity of images. This is done in pairs, that is to say that a first frame and a succeeding second frame are provided. A second, succeeding step S62 involves detecting objects from the first and second frames. In a more specific embodiment, this involves generating a plurality of object proposals (S620), on the basis of which the objects are detected.

Afterward, step S63 involves selecting an object from the first and second frames. Step S64 involves ascertaining at least one classification vector and a position for the object in each case for the first and second frames. Step S65 involves determining a correlation between the two selected objects. A check is thus made to establish whether the objects are the same or different objects. For this purpose, an association value is ascertained, which results from a correlation analysis and on the basis of the ascertained classification vector and the position. In this case, the association value is all the greater, for example, the greater the probability of both objects being the same.

If the association value is above a certain level or is the greatest value, provided that all objects have been compared with one another in this way, then step S66 involves generating a temporarily consistent and unique identification or identification vector of the at least one object for each frame in response to the ascertained association value. A relation for creating the association value is to be set out in this context.

Between the first and second frames there is always a certain time in which the object may move from one position to another position. In this case, the deviation with regard to the position may be all the greater, the more time elapses between the first and second frames, or the slower the image refresh rate. The confidence level for an association on the basis of the position or else the position prediction for the object decreases as a result.

For this reason, for the association, use is made not just of the classification and the position, rather a relative weighting of these parameters with respect to one another is also effected. In particular, the weighting shifts in favor of the classification vector, the greater the time interval between the two frames. In other words, the position is weighted less strongly if the time between frames increases, or the image refresh rate decreases. From two objects associated with one another in this way, it is possible to determine the trajectory of the object for the two frames.

Detecting an object in step S62 may necessitate a plurality of tasks or intermediate steps. By way of example, one or more bounding boxes or object proposals are generated. In this case, the bounding boxes as bounding elements surround the at least one object. Besides detection of the objects ($Det_t$, $Det_{t-1}$) from the object proposals (ROIs) in step S620, a prediction ($P_{t-1 \to t}$) for a change in position for the bounding box from the first frame to the second frame is generated in step S621. Likewise, a velocity vector ($V_{t-1 \to t}$) is formed for the bounding box of the first frame.

Different bounding boxes and thus objects can be selected for the later comparison. By way of example, it is possible to select a bounding box of the first frame and a bounding box of the second frame. In this case two detected objects $Det_{t-1}$, $Det_t$ that were ascertained in step S620 are selected (S630). Alternatively, the prediction $V_{t-1 \to t}$ (S620) can also be used jointly with a bounding box and an object $Det_t$ of the second frame. A suitable third possibility involves using the ascertained velocity vector $V_{t-1 \to t}$ and selecting the bounding box of an object of the second frame.

For determining the classification vector in step S64, features of the object are acquired in step S640 and a unique feature vector is determined from the acquired features (S641). By means of the feature vector an object can be classified by the feature vector being compared with predefined class vectors, for example, and the class vector with the greatest correlation being used as the class of the object. By way of example, the class vectors can be selected from a previously defined group. The network used to carry out this method was also trained with these class vectors.

After the association value has been generated, a Hungarian combinatorial optimization method can be used for generating a temporarily consistent and unique identification vector.

The proposed method thus recognizes objects in two successive frames. A unique ID value is assigned to them, such that they can be tracked with this value even over a plurality of frames.

In particular, generating the feature vector makes it possible to reidentify an object, i.e. to identify it correctly as a known object even if it is not visible over some frames. The above method can be carried out over a longer video sequence with frames in pairs. By linking identical ID values over the sequence, it is possible to generate trajectories of the objects of the sequence which are usable for various applications, e.g. safety and monitoring.

In some other applications, it is expedient for lost objects to be identified correctly again. One example besides the monitoring of persons can also be found in the field of autonomous driving, for example if a vehicle, during an overtaking procedure, disappears from the field of view of the camera and reappears later. In this regard, according to the method it is possible to compare an object in the second frame which is not assignable to an object in the first frame (for example because the association values are too low) with objects from preceding frames. By means of the unique ID value, therefore, newly appearing objects are compared with older objects and reidentified if there is correspondence.

Another aspect relates, as already set out above, to machine-based training in order to be able to correctly detect, identify and classify objects. While these tasks are trained sequentially in conventional deep learning networks, the method and arrangement provides for carrying this out in parallel, jointly and simultaneously. As in all training processes, for this purpose a series of test images are presented, the objects of which have already been correctly classified. The training is intended then not only to detect these objects with the correct classification and to track them over a plurality of frames, but also to learn features which are typical of specific classes. In addition, the features serve for improving the prediction and thus the tracking.

Figure 7:
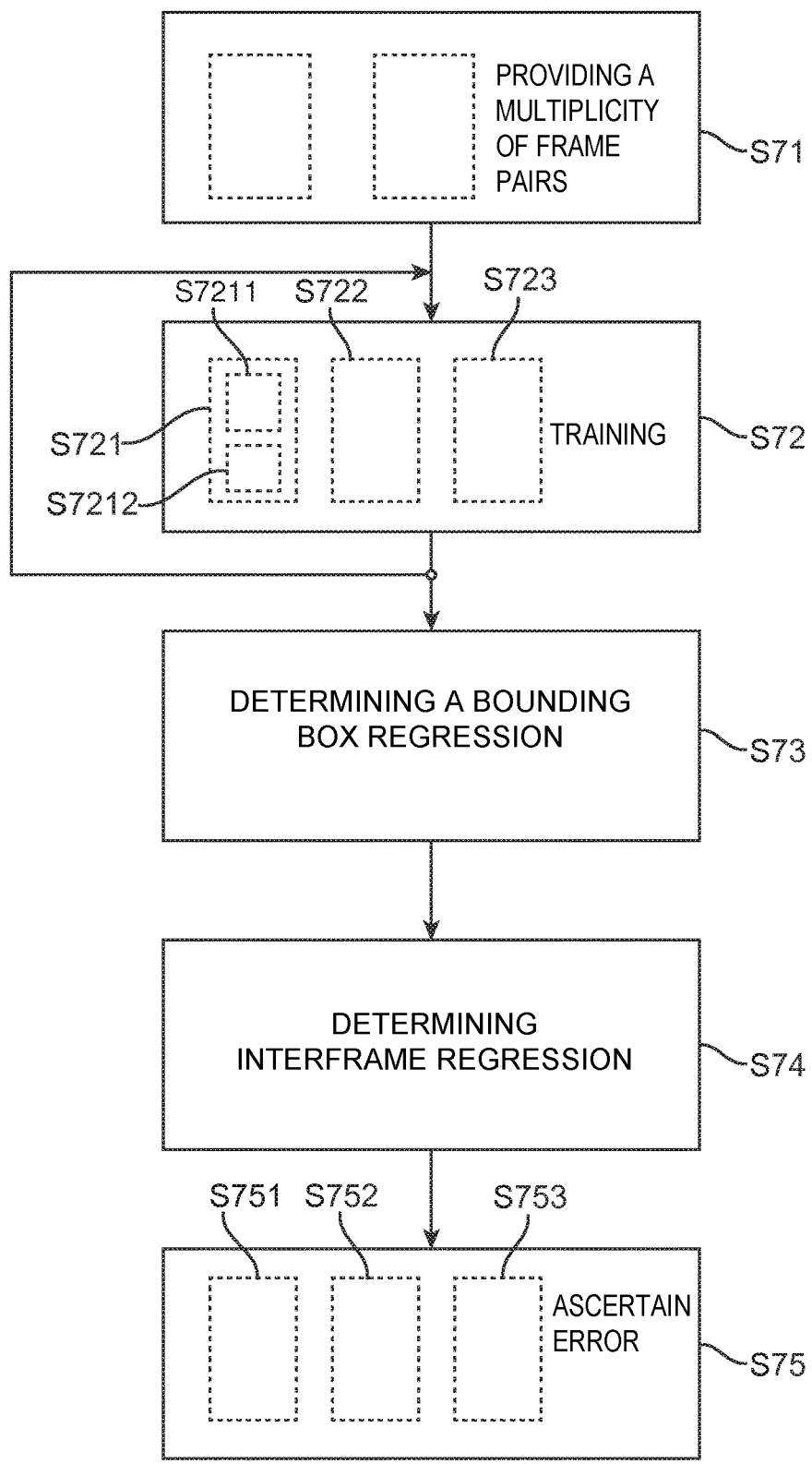
FIG. 7 shows an embodiment of a method for training a computer-based network according to the proposed principle.

FIG. 7 shows a configuration of the method for machine-based training of a computer-implemented network for common detecting, tracking and classifying of at least one object in a video image sequence having a multiplicity of successive frames. For this purpose step S71 involves providing a multiplicity of frame pairs. Each frame pair contains a first frame and a succeeding second frame. Furthermore, each frame has at least two object proposals (ROIs), to which a respective class identification vector is uniquely assigned. In other words, each region of interest (ROI) has a unique and known class identification. Expediently, each object proposal for the training has an object which is assigned to a predefined class by means of the class identification vector.

With this precondition the training begins in step S72, in which a feature vector is then ascertained (S721) for each of the at least two object proposals, which feature vectors are assigned to the class identification vector. In parallel therewith and identification vector is determined (S722) for each object proposal. Finally, a bounding box regression is determined (S723) for each object proposal, said regression being specific to the class identification vector.

In an optional step in S72, features of a predefined size from the frames are pooled (S7211) by means of an R-CNN method and are then convolved (S7212) by means of a convolution block with subsequent pooling to form a global vector. This is expedient if the global feature vector or else the pooled features is/are used for determining the bounding box regression and the identification vector and/or further tasks. As a result, computation time and complexity are saved, in contrast to purely sequential processing. A fully connected layer of a defined size is applied to the global vector in order to obtain a lower-dimensional identification vector by comparison with the global vector. This also includes an online instance matching loss method. A smaller n-dimensional identity vector is learned by means of this approach, wherein n is 256, in particular.

An optional step S722 involves ascertaining a classification score by applying two fully connected layers of size (C+1) and 4×(C+1) to the object proposals, wherein (C+1) is the number of class identification vectors including the image background.

The method then continues with step S73 and ascertains a feature map—correlated for each of the at least two object proposals—between the first frame and the succeeding second frame. This is done by ascertaining a correlation between features of a first feature map of the first frame with the features of segments of a second feature map that are adjacent to the first feature map. Expressed in a simplified way, what is sought is a correlation between a feature of the first frame in segments of the second frame, wherein the segments are adjacent to the corresponding position of the feature in the second image. This results in the acquisition of movements of the feature in the second image.

In step S74, this feature map is used to determine an inter-frame regression for each object proposal. Since the results are known during training (the images presented for training are known), an error can then be ascertained (S75) for each training cycle.

However, this is done by acquiring a combinatorial error, rather than the error for each of the preceding steps individually. Said combinatorial error results from the errors in determining the class identification vector, determining the at least one identification vector, determining the specific bounding box regression and determining the inter-frame regression. In one case, the combinatorial error can be formed (S75) by the sum of these errors. This combinatorial error is then minimized for training.

In one example, a softmax cross entropy loss method is applied (S751) for determining the error in the classification. A smooth L1-loss method can be used for determining the bounding box regression error, as is carried out in step S752. The same method is also used in step S753 in order to ascertain the error of an inter-frame regression.

In principle, the methods disclosed in this application are applicable not only to video sequences or images in the visible range, but also to sensor-based information in other spectral ranges or even other sensor-based information, for example sound or radar.

LIST OF REFERENCE SIGNS 1, 25 Camera
2 Network
3 Tracking module
4 Application
5 Prediction module
6 Identification module
7 Detection module
20 Computer
21, 22 Processors
23 Memory
24 Video buffer memory
31 Van, object
32 Bus, object
33 Car, object
34 Car, object
DetIdenNet Determination and identification module
PredNet Prediction module
BaseNet Base module
$f^{t-1}$, $f^t$ Features

The invention claimed is:

1. A method for common detecting, tracking, and classifying of at least one object in a video image sequence having a multiplicity of successive frames by means of a trained computer-implemented network; wherein the method comprises:
receiving a first frame and a succeeding second frame;
detecting at least one object in the first frame and the succeeding second frame;
selecting an object from the first and second frames;
ascertaining at least one classification vector and a position for the object from the first and second frames;
ascertaining an association value on the basis of the ascertained classification vector and the position comprising providing a relative weighting between the at least one ascertained classification vector and the position by an already trained network during its execution in detecting, tracking and classifying, said relative weighting being dependent on the time between the received first and succeeding second frames;
generating a temporarily consistent and unique identification vector of the at least one object for each frame in response to the ascertained association value.

2. The method as claimed in claim 1, wherein the detecting at least one object comprises:
generating a bounding box surrounding the at least one object;
generating a prediction for the bounding box from the first frame to the second frame;
generating a velocity vector for the bounding box of the first frame.

3. The method as claimed in claim 2, wherein a bounding box is provided for each of the at least one object.

4. The method as claimed in claim 2, wherein the selecting comprises at least one of:
selecting the bounding box of the first frame and selecting the bounding box of the second frame;
selecting the prediction and selecting the bounding box of the second frame; and
selecting the velocity vector and selecting the bounding box of the second frame.

5. The method as claimed in claim 1, wherein the ascertaining at least one classification vector comprises:
acquiring features of the object;
calculating a unique feature vector from the acquired features; and
classifying the object from a group of predefined classes on the basis of the acquired features or on the basis of calculated feature vector.

6. The method as claimed in claim 1, wherein the relative weighting between the ascertained classification vector and the position rises with increasing time or a falling frame rate between the first and second frames.

7. The method as claimed in claim 1, wherein the generating a temporarily consistent and unique identification vector comprises a Hungarian combinatorial optimization method.

8. The method as claimed in claim 1, wherein the unique identification of an object of a second frame that is not assignable to any object of a first frame is compared with the identification of an object of a third frame temporally proceeding the first frame.

9. A system for classifying objects on a computer which comprises:
a memory and one or more processors configured to perform the method as claimed in claim 1.

10. A computer program product stored on a non-transitory computer readable medium and having instructions which, when executed on one or more processors, carry out the method as claimed in claim 1.

\* \* \* \* \*